United States Patent [19]

Aronson et al.

[11] 4,304,583

[45] Dec. 8, 1981

[54] PROCESS FOR DRYING OPTICAL WAVEGUIDE PREFORMS

[75] Inventors: Bernard S. Aronson, Elmira; Peter P. Bihuniak, Corning; Marc S. Giroux, Big Flats; Clifford L. Hund, Horseheads, all of N.Y.

[73] Assignee: Corning Glass Works, Corning, N.Y.

[21] Appl. No.: 155,394

[22] Filed: Jun. 2, 1980

[51] Int. Cl.³ .................... C03B 19/06; C03B 32/00
[52] U.S. Cl. ........................... 65/18.2; 65/32; 65/312
[58] Field of Search .............. 65/3 A, 32, 18.2; 427/163

[56] References Cited

U.S. PATENT DOCUMENTS

| | | | |
|---|---|---|---|
| 2,326,059 | 8/1943 | Nordberg | 106/52 |
| 3,806,570 | 4/1974 | Flamenbaum et al. | 65/3 A X |
| 3,823,995 | 7/1974 | Carpenter | 65/32 X |
| 3,826,560 | 7/1974 | Schultz | 65/32 X |
| 3,868,170 | 2/1975 | DeLuca | 65/32 X |
| 3,933,454 | 1/1976 | DeLuca | 65/3 A |
| 4,125,388 | 11/1978 | Powers | 65/3 A |
| 4,157,906 | 6/1979 | Bailey | 65/3 A |
| 4,165,223 | 8/1979 | Powers | 65/32 X |
| 4,251,251 | 2/1981 | Blankenship | 65/18.2 |

Primary Examiner—Richard V. Fisher
Attorney, Agent, or Firm—Kees van der Sterre

[57] ABSTRACT

Optical waveguide preforms and other glass articles produced by gas-drying and consolidating porous glass soot preforms are provided utilizing a consolidation method wherein consolidation proceeds from the drying gas inlet to the drying gas outlet end of the preform, this method resulting in more uniform water attenuation characteristics in the articles.

4 Claims, 3 Drawing Figures

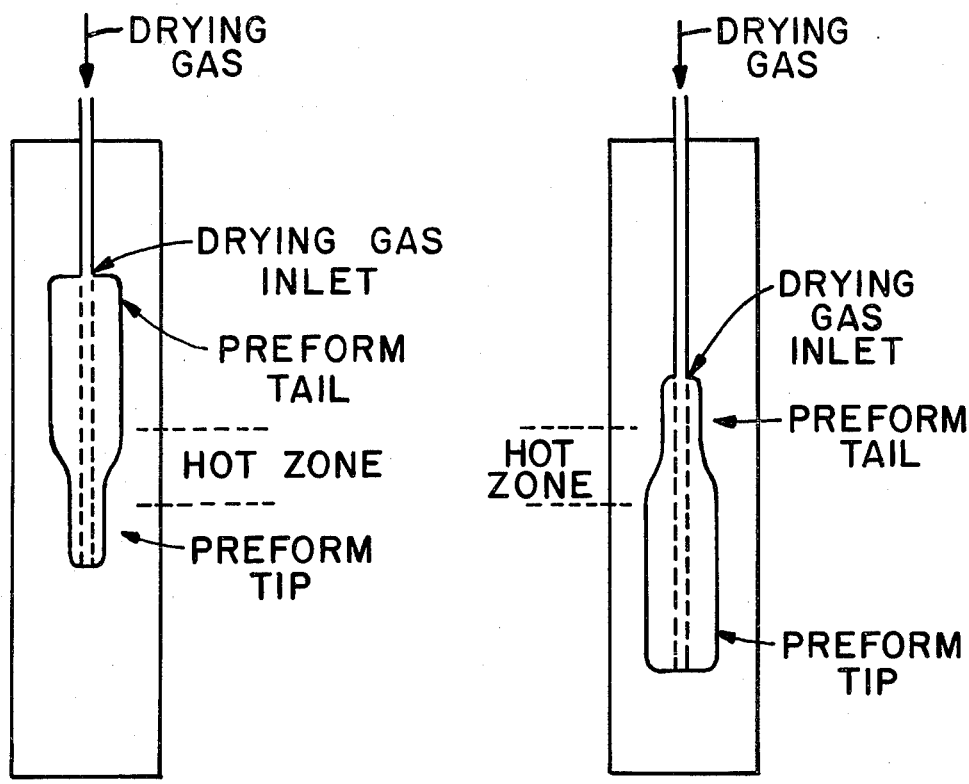
Fig. 1 (PRIOR ART)
Fig. 2
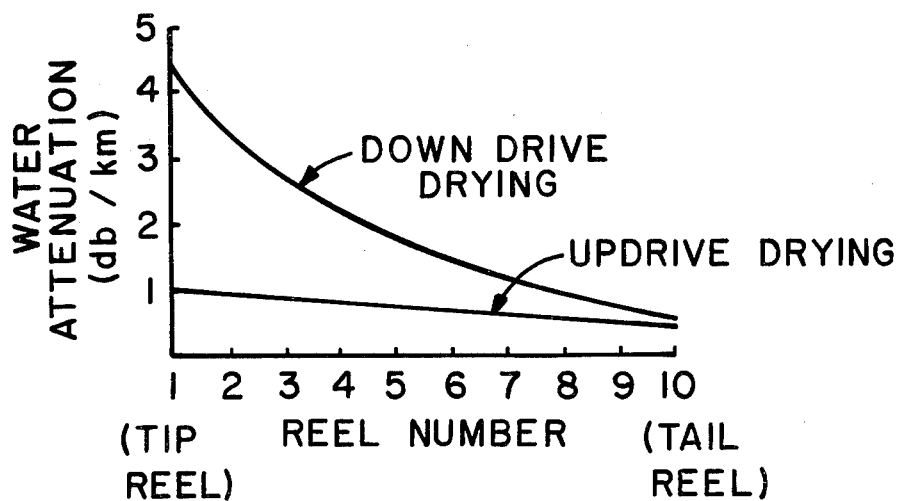
Fig. 3

PROCESS FOR DRYING OPTICAL WAVEGUIDE PREFORMS

BACKGROUND OF THE INVENTION

The present invention relates to the manufacture of glass optical waveguide preforms or blanks by the doped deposited silica process, and particularly to an improvement in the known outside vapor phase oxidation (OVPO) process wherein optical waveguide blanks having low water (OH) gradients can be made.

U.S. Pat. Nos. 3,823,995 and 3,826,560 describe the manufacture of glass optical waveguides from silica and doped silica of high purity by depositing concentric layers of these materials on suitable tubular or cylindrical substrates and working the layered structures into optical waveguide filaments. In the process known as the outside or OVPO process, an optical waveguide blank is built up on a rotating, substantially cylindrical bait rod or mandrel by depositing layers of pure or doped silica glass in soot form thereon, the glass soot being vitreous (amorphous) and being produced by the flame oxidation of combustible volatile compounds of silicon, boron, germanium, phosphorus or the like.

After the soot layers have been deposited to provide a cylindrical soot preform, the central mandrel is removed leaving a central axial aperture in the preform. The preform is then dried to remove water and/or hydroxyl groups introduced into the soot structure during the deposition process while being consolidated into a clear glass tubular preform. Finally the clear tubular preform is drawn into an optical waveguide filament.

A number of different patents describing the manufacture of doped silica optical waveguides by OVPO processes have been issued. Representative patents, in addition to those noted above, include U.S. Pat. Nos. 3,806,570, 3,868,170, 3,933,454, 4,125,388 and 4,165,223.

The drying and consolidation of a silica soot preform is customarily carried out in a furnace which comprises a heated consolidation zone. The soot preform is passed slowly through the consolidation zone, causing progressive consolidation of the porous soot preform to a clear tubular glass blank as the zone is traversed. The progressive consolidation of porous silica is quite old, an early example of such process being shown in U.S. Pat. No. 2,326,059.

For optical waveguide applications, wherein the presence of residual hydroxyl groups in the finished optical waveguide is detrimental to performance, soot preforms are typically dried in the consolidation furnace contemporaneously with the consolidation process. A soot preform prepared by soot deposition as above described is quite porous, and recent practice, as shown in U.S. Pat. Nos. 4,125,388 and 4,165,223 has been to introduce a flowing stream of a drying gas or gas mixture into one end of the preform aperture, permitting this gas to exit the preform through the porous preform body as well as out the opposite end of the aperture. The flow of drying gas is continued while the preform is slowly lowered through the heated consolidation zone.

Although present drying methods are acceptable in terms of reducing the amount of residual hydroxyl species in consolidated preforms, it has been found that preforms treated by such methods exhibit a longitudinal gradient in hydroxyl ion concentration, referred to as an intra-blank water gradient, such that a typical dried consolidated preform or blank exhibits a higher hydroxyl content at one end than at the other. It is not unusual for a length of optical waveguide filament drawn from one end of such a blank to exhibit water attenuation values at a wavelength of 950 nm which are 2-7 db/km or more higher than filament drawn from the other end of the blank.

It would be desirable from the standpoint of product selection to reduce such intra-blank water gradients, so that all sections of optical waveguide drawn from a single blank would exhibit approximately equivalent water attenuation characteristics. Such a reduction would be particularly desirable if it could be accomplished without increasing the mean water attenuation value exhibited by waveguide drawn from the preform.

It is therefore the principal object of the present invention to provide an improvement in the soot preform drying process whereby consolidated preforms exhibiting lower water gradients may be obtained.

Other objects and advantages of the invention will become apparent from the following description thereof.

SUMMARY OF THE INVENTION

As previously indicated, in accordance with the known method for making a consolidated optical waveguide preform, a coating of glass soot is first deposited on a starting member to a desired thickness to form a porous soot preform. After this preform has been formed, the starting member is removed, leaving an aperture in the preform having an inlet at one end through which the drying gases are subsequently to be introduced and an exit of the other end from which some of the drying gases will be emitted.

Thereafter, the preform is disposed in a furnace having a heated consolidation zone and the drying gas is introduced into the preform at the aperture inlet end. This gas exits the preform via both the intersticies of the porous soot preform structure and the aperture exit at the opposite end of the preform. After the flow of drying gas has been initiated, consolidation of the preform is accomplished by passing the preform slowly through the heated consolidation zone, that zone being maintained at a temperature sufficient to cause the soot particles to fuse into a dense glass layer so that a solid tubular glass preform is provided. The known drying and consolidation procedures are more fully described in the aforementioned U.S. Pat. Nos. 4,125,388 and 4,165,223, and those patents are expressly incorporated by reference herein for additional information relating to such procedures.

Up to the present time, the practice has been to initiate the consolidation process at the end of the soot preform incorporating the aperture exit, commonly referred to as the tip end of the preform because it is the first portion of the preform to be later drawn. This has been accomplished by simply lowering the preform into the hot zone of the vertically disposed consolidation furnace, a procedure hereinafter sometimes referred to as downdrive drying.

We have now discovered that a substantial reduction of the intra-blank water gradient in a consolidated optical waveguide blank can be provided by reversing the direction of preform consolidation. Hence, contrary to the prior practice, the present invention requires that the soot preform be passed through the heated consolidation zone in a direction such that consolidation proceeds from the aperture inlet or tail end of the preform to the aperture exit or tip end of the preform. This can be accomplished by drawing the soot preform up through the hot zone of a vertically disposed consolidation furnace, a process hereinafter sometimes referred to as updrive drying.

BRIEF DESCRIPTION OF THE DRAWING

The invention may be further understood by reference to the drawing wherein:

FIG. 1 schematically illustrates tip-initiated or downdrive consolidation in accordance with the prior art;

FIG. 2 schematically illustrates tail-initiated or up drive consolidation in accordance with the invention; and FIG. 3 is a graphical representation of the attenuation due to water exhibited by optical waveguide filaments produced utilizing the drying procedures of the invention and of the prior art.

DETAILED DESCRIPTION

As is evident from an examination of FIG. 1 of the drawing, under prior practice the consolidation of the soot preform was undertaken by lowering the preform into the hot zone of a consolidation furnace so that consolidation of the preform proceeded from the tip end toward the tail or drying gas inlet end of the preform. In this procedure, the drying gases reaching the consolidating tip have previously passed through relatively cool, hydroxyl-containing, unconsolidated portions of the preform.

In the updrive drying procedure schematically illustrated in FIG. 2 of the drawing, the soot preform is drawn up through the hot zone of the furnace so that consolidation is initiated in the region proximate to the drying gas inlet. In this procedure the drying gases passing through the consolidating soot have not previously been exposed to relatively cool, undried glass.

Although the reason for the effectiveness of the present invention in reducing intra-blank water gradients is not fully understood, it is known that the reaction between the drying gas and a given concentration of hydroxyl ions depends upon the initial drying gas concentration, temperature and time. Minimizing the intra-blank water gradient necessitates making these parameters relatively constant during the course of the reaction. For a zone consolidation process such as hereinabove described, this is facilitated by initiating drying at the drying gas inlet end.

The method of the invention is of course not limited in utility to the production of optical waveguide blanks, but could be employed for producing a consolidated glass article from essentially any soot preform produced by the flame oxidation of volatile compounds to glass-forming or glass-modifying oxides. The only structural requirement is that the preform have a porous structure comprising an interstitial, gas permeable volume amenable to gas drying.

The invention may be carried out using any of the known consolidation furnace designs employing zone heating, and with any of the known types of gas drying equipment adapted to feed a drying gas stream into an aperture in a soot preform. The drying gas or gas mixture employed is likewise not critical, although mixtures which comprise chlorine gas as a drying agent are presently preferred. For the purposes of the present description, a drying gas stream is any stream of gas which is effective to remove at least some hydroxyl groups from a porous glass soot preform at some temperature below the consolidation temperature of that preform.

To demonstrate the effectiveness of the present invention in reducing water gradients in soot preforms, a comparative study was undertaken in which eight optical waveguide soot preforms of approximately equivalent size, weight and density were dried under controlled conditions. Four of the preforms were dried by processing through an updrive drying cycle and four using the conventional downdrive drying cycle. The preforms averaged about 460 grams in weight and had a consolidated length on the order of about 40 cm., containing sufficient glass to produce approximately nine one-kilometer reels of 125 micron-diameter optical waveguide filament, although breakage during fiber drawing reduced the actual number of complete reels obtained in most cases.

Both types of drying were carried out at a hot zone or peak consolidation temperature of 1315° C. and at a preform driving rate of 6.5 mm/min through the consolidation zone. The drying gas introduced into the inlet end of each preform centerhole aperture during consolidation consisted of $Cl_2$ at a flow rate of 13.0 sccm, $O_2$ at a flow rate of 0.8 slpm, and He at a flow rate of 0.79 slcm.

After the preforms had been dried and consolidated, the consolidated blanks were drawn into optical waveguide filaments using well known drawing techniques and equipment. The drawn filament was wound onto 1.1-kilometer reels, the reels being numbered according to the order in which they were wound with filament drawn from each blank. Thus Reel 1 in each case contained waveguide filament drawn from the tip end of the blank, while the last reel contained filament drawn from the tail or drying gas inlet end of the blank.

After the drawing of the blanks had been completed, the reels were tested to determine an average water attenuation value for each reel, noting the blank number and position in the blank from which the waveguide filament had been drawn. The average water attenuation value for each reel was that portion of the total attenuation attributable to the presence of hydroxyl groups in the glass making up the waveguide. Of course, the total attenuation values also included attenuation contributions from material absorption and scattering by the waveguide.

The data resulting from these measurements were processed and values for the average water attenuation exhibited by each blank and the change in hydroxyl concentration with length for each blank (water gradient) were determined. The water gradient value for each blank corresponded to the average change in water attenuation from reel to reel progressing from the tip end (first reel) to the tail end (last reel) of each blank. This gradient is expressed as an attenuation change per reel (db/km-reel).

The following Table sets forth data resulting from the above-described study. The blanks which are processed through the downdrive drying cycle have been grouped separately in the Table from the blanks processed through the updrive drying cycle, for purposes of comparison. The Table includes a blank number for each of the eight blanks, a water attenuation value for each blank, in db/km as measured at 950 nm, a water gradient value for each blank, expressed in db/km-reel, and a water attenuation value for the first-drawn length of waveguide from each blank. This latter value corresponds to the water attenuation value exhibited by Reel 1 from each blank, which is drawn from the blank tip and thus normally exhibits the highest attenuation value of any waveguide drawn from the blank, if the blank has been consolidated by the downdrive drying process. Mean values for each of these variables, calculated separately for the updrive and downdrive process groups, are also reported.

TABLE

| Blank No. | Blank Water Attenuation @950 nm (db/km) | Blank Water Gradient (db/km-reel) | First Reel Water Attenuation (db/km) |
|---|---|---|---|
| Downdrive Drying | | | |
| 1 | 0.99 | −0.35 | 2.22 |
| 3 | 1.92 | −0.52 | 4.24 |
| 5 | 2.15 | −0.51 | 4.44 |
| 6 | 2.23 | −0.71 | 5.79 |
| Mean Down-drive Values | 1.89 | −0.52 | 4.17 |
| Updrive Drying | | | |
| 2 | 1.76 | 0.27 | 0.88 |
| 4 | 0.76 | −0.36 | 1.99 |
| 7 | 0.34 | −0.084 | 0.64 |
| 8 | 0.42 | −0.13 | 0.75 |
| Mean Updrive Values | 0.77 | −0.076 | 1.07 |

As is evident from a study of the above Table, a substantial reduction in the water gradient values exhibited by individual blanks results from the utilization of an updrive drying cycle in accordance with the invention, the mean gradient value of the downdrive blanks being −0.52 db/km-reel and the mean value of the updrive blanks being −0.076 db/km-reel. It is also evident from the mean blank water attenuation values that this reduction in water gradients has been accomplished without increasing the overall water attenuation of the blanks. In fact a slight reduction in overall blank water attenuation appears to have been obtained, the mean water attenuation of the downdrive-processed blanks being 1.89 db/km and that of the updrive-processed blanks being 0.77 db/km. Although slightly higher overall attenuations (water attenuation plus material absorption plus scattering) were observed for the updrive-dried products, it is believed that this was caused primarily by somewhat higher seed levels in the updrive blanks, a problem which can readily be resolved by an optimization of updrive drying process parameters.

The differences in water attenuation characteristics between blanks provided in accordance with the invention and in accordance with prior art practice are graphically illustrated in FIG. 3 of the drawing, which consists of two curves showing water attenuation as a function of reel number for the downdrive and updrive drying processes. The curves are based on mean reel attenuation values for the updrive and downdrive reels. The substantially higher mean tip-end water attenuation value calculated for the downdrive-dried blanks, when compared with the updrive-dried blanks, is evident, as is the significantly lower mean gradient in water attenuation from the tip end to the tail end of the updrive-dried blanks.

Of course the foregoing examples are merely illustrative of techniques which could be employed in the practice of the invention as hereinabove described. While the process has been exemplified by the so-called updrive drying technique, the operative principle is that of zone consolidating a soot preform commencing at the drying gas inlet end and progressing to the opposite end thereof. Thus there is no requirement that the process be carried out by drawing upwardly through a hot zone in a vertically disposed furnace; rather a horizontally disposed furnace could be employed or provisions made for introducing drying gas into a bottom inlet in a downwardly moving preform.

Similarly there is no requirement that the preform be moved through a stationary consolidation zone, since a moving hot zone and stationary preform would also provide the relative movement between the hot zone and preform necessary for zone consolidation. It is contemplated that these and other modifications and variations of the above-described procedures may be resorted to within the scope of the appended claims.

We claim:

1. In the method of forming a glass article comprising the steps of depositing on a starting member a coating of glass soot to form a porous soot preform, removing the starting member from the preform to leave an aperture having an inlet at one end of the preform and an exit at the other end of the preform, disposing the preform in a furnace having a heated consolidation zone, introducing a drying gas stream into the aperture inlet, and moving the preform relative to the heated consolidation zone to cause the soot particles of the preform to fuse into a dense glass layer, the improvement wherein:

the soot preform is moved relative to the heated consolidation zone in a direction such that consolidation proceeds from the aperture inlet end to the aperture exit end of the preform, thereby to provide an article exhibiting a reduced water gradient from the drying gas inlet end to the drying gas outlet end thereof.

2. A method in accordance with claim 1 wherein the drying gas stream includes chlorine.

3. A method in accordance with claim 1 wherein the preform and furnace are vertically disposed.

4. A method in accordance with claim 3 wherein the aperture inlet is located at the upper end of the preform and the preform is consolidated by drawing upwardly through the heated consolidation zone.

* * * * *